US009639642B2

(12) United States Patent
Jetcheva et al.

(10) Patent No.: US 9,639,642 B2
(45) Date of Patent: May 2, 2017

(54) TIME SERIES FORECASTING ENSEMBLE

(71) Applicant: FUJITSU LIMITED, Kawasaki-shi, Kanagawa (JP)

(72) Inventors: Jorjeta Jetcheva, San Jose, CA (US); Mostafa Majidpour, Los Angeles, CA (US)

(73) Assignee: FUJITSU LIMITED, Kawasaki (JP)

( * ) Notice: Subject to any disclaimer, the term of this patent is extended or adjusted under 35 U.S.C. 154(b) by 811 days.

(21) Appl. No.: 14/050,038

(22) Filed: Oct. 9, 2013

(65) Prior Publication Data

US 2015/0100295 A1    Apr. 9, 2015

(51) Int. Cl.
G06G 7/54        (2006.01)
G06F 17/50      (2006.01)

(52) U.S. Cl.
CPC ...... *G06F 17/5036* (2013.01); *G06F 2217/78* (2013.01)

(58) Field of Classification Search
CPC .......... G06F 17/5036; G06F 2217/78
USPC ...................... 703/2, 18; 705/7.12
See application file for complete search history.

(56) References Cited

U.S. PATENT DOCUMENTS 8,990,149 B2 *   3/2015  Danciu ............. G06Q 10/06
                                                703/2
2014/0324532 A1 * 10/2014 Ghosh ............. G06Q 30/0206
                                                705/7.31

OTHER PUBLICATIONS

Dannecker et al. "Partitioning and Multi-core Parallelization of Multi-equation Forecast Models". SSDBM 2012, LNCS 7338, pp. 106-123, 2012.*
Park et al. "Electric Load Forecasting Using an Artificial Neural Networks". IEEE Transactions on Power Engineering, vol. 6, pp. 442-449 (1991).*
Park et al. "Electric Load Forecasting Using an Artificial Neural Networks". Energy Conversion and Management 75 (2013) 561-569.*
J. W. Taylor, L. M. de Menezes and P. E. McShary, "A Comparison of univariate methods for forecasting electricity demand up to a day ahead", International Journal of Forecasting, vol. 22, pp. 1-16, 2006.
J. W. Taylor, "Short-Term Electricity Demand Forecasting Using Double Seasonal Exponential Smoothing", Journal of Operational Research Society, 54, 799-805, 2003.

(Continued)

*Primary Examiner* — Eunhee Kim
(74) *Attorney, Agent, or Firm* — Maschoff Brennan

(57) ABSTRACT

A method of forecasting a resource load for consumption at a site, e.g., an electrical load of a site. The method includes receiving historical load data and historical ambient condition data that are time series data pertaining to a site and generating additional data from the received data. The method includes building a best sub-model for each of multiple forecast intervals. The building includes clustering in parallel training portions of the historical load data and the additional data, training possible sub-models using the clustered training portions, verifying forecasted loads output from the possible sub-models against verification portions of the historical load data and the additional data, and determining a first subset of parameters for the best sub-model based upon accuracy of the forecasted loads. The method includes forecasting a resource load at the site for each of the forecast intervals using an ensemble of the best sub-models.

20 Claims, 8 Drawing Sheets

(56) References Cited

OTHER PUBLICATIONS

M. Ghomi, M. Goodarzi, and M. Goodarzi, "Peak Load Forecasting of Electric Utilities for West Province of IRAN by Using Neural Network without Weather Information," In Proceedings of the 2010 12th International Conference on Computer Modelling and Simulation, Mar. 2010.

H. S. Hippert, C. E. Pedreira and R. Souza, "Neural networks for short term load forecasting: A review and evaluation," IEEE Transactions on Power Systems,. vol. 16, pp. 44-55, Feb. 2001.

M. De Felice and X. Yao, "Neural Networks Ensembles for Short-Term Load Forecasting," in IEEE Symposium Series in Computational Intelligence (SSCI 2011), Apr. 2011.

P. R. Winters, "Forecasting Sales by Exponentially weighted moving averages" Management Science 6, pp. 324-342, Apr. 1960.

S. Jafarzadeh, S. Fadali, C.Y. Evrenosoglu, H. Livani, "Hour-ahead wind power prediction for power systems using hidden Markov models and Viterbi algorithm," IEEE PES General Meeting, Jul. 2010.

L. Breiman, "Random Forests", Machine Learning, 45,(1), pp. 5-32, 2001.

Sankaranarayanan Subbayya, Jorjeta G. Jetcheva, and Wei-Peng Chen. Model Selection for Short-Term Microgrid-Scale Electricity Load Forecasts. Proceedings of the Fourth IEEE PES Conference on Innovative Smart Grid Technologies (ISGT), Washington, D.C., Feb. 2013.

Q. Tan, et. al, "Energy Consumption Forecasting Using Support Vector Machines for Beijing", International Conference on E-Product E-Seivice and E-Entertainment (ICEEE), Nov. 2010.

S. Yang, and Y. Wang, "Applying Support Vector Machine Method to Forecast Electricity Consumption," International Conference on Computational Intelligence and Security, Nov. 2006.

E. E. El-Attar, J. Y. Goulermas, and Q. H.Wu, "Forecasting electric daily peak load based on local prediction," in Proc. IEEE Power Eng. Soc. Gen. Meeting (PESGM 2009), Calgary, Canada, Jul. 2009.

F.A. Razak, A.H. Hashim, I.Z. Abidin and M. Shitan, "Malaysian Peak Daily Load Forecasting" proceeding of Scored 2009.

J. Xiao, L. Hou, F. Luo, and C. Chen, "Load forecasting and its calibration method considering the influence of temperature," Electric Utility Deregulation and Restructuring and Power Technologies, Apr. 2008.

* cited by examiner

TIME SERIES FORECASTING ENSEMBLE

FIELD

The embodiments discussed herein are related to time series forecasting ensembles.

BACKGROUND

Energy usage data has been limited to large portions of an electrical distribution system such as energy usage data measured at grid switch points. Accordingly, load forecasting in electrical distribution systems has generally focused on aggregate loads for multiple sites or the large portions of the electrical distribution system. Forecast aggregate loads, however, may not be specific enough for use at an individual site level. Accordingly, forecast aggregate loads may not be useful in site-specific energy efficiency analysis or in demand response (DR) analysis.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of forecasting an electrical load of a site may include receiving historical load data and historical ambient condition data. The historical load data and historical ambient condition data may be time series data pertaining to a site. The method may also include generating additional data from the received historical load data and the received historical ambient condition data. The method may further include building a best sub-model for each of multiple forecast intervals. The building may include clustering in parallel a training portion of the historical load data and a training portion of the additional data, training possible sub-models using the clustered training portions, verifying forecasted loads output from the possible sub-models against verification portions of the historical load data and the additional data, and determining a first subset of parameters for the best sub-model based upon accuracy of the forecasted loads. The method also includes forecasting an electrical load of the site for each of the forecast intervals using an ensemble of the best sub-models.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to forecasting ensembles. A forecasting ensemble may be implemented to forecast a specific behavior pertaining to a particular entity at multiple forecasting intervals, e.g., to forecast energy resource(s) to be expended or consumed at a site(s) or by an entity(ies). The forecasting ensemble may include a combination of best sub-models. Each of the sub-models may be constructed for a specific forecast interval and may be selected from multiple possible sub-models for the forecast interval. To construct the sub-models, a forecasting system may include an ensemble module and a data processing module. The processing module may receive primary data and secondary data and may generate additional data from the primary data and/or the second data. The ensemble module may cluster the primary data and/or the additional data derived from the primary data and the second data. The ensemble module may then train multiple possible sub-models using the clustered data. The multiple possible sub-models may be configured to output forecasted behavior, which may be verified against portions of the primary data and/or the additional data. Based on accuracy of the forecasted behaviors output from the possible sub-models, parameters of a best sub-model for each forecast interval may be determined.

An example embodiment may include a forecasting system configured to forecast an electrical load of a site. The forecasted load of the site may be specific to a relatively short period of time such as a day, an hour, or another forecast interval. The forecasted load may be based on an ensemble of sub-models, in which each of the sub-models is specifically constructed for one of the forecast intervals. To construct each of the sub-models, historical load data and/or additional data derived from the historical load data may be processed to train possible sub-models, which may be configured to forecast accurate load data. More specifically, in this and other embodiments, constructing the best sub-model may include building a best sub-model and then tuning the best sub-model. The forecasting system may then combine the best sub-models for each forecast interval into a forecasting ensemble. The forecasting system may then forecast electrical loads of the site at each of the forecast intervals using the forecasting ensemble of the best sub-models. Some details of this and other embodiments will be explained with reference to the accompanying drawings.

Figure 1A:
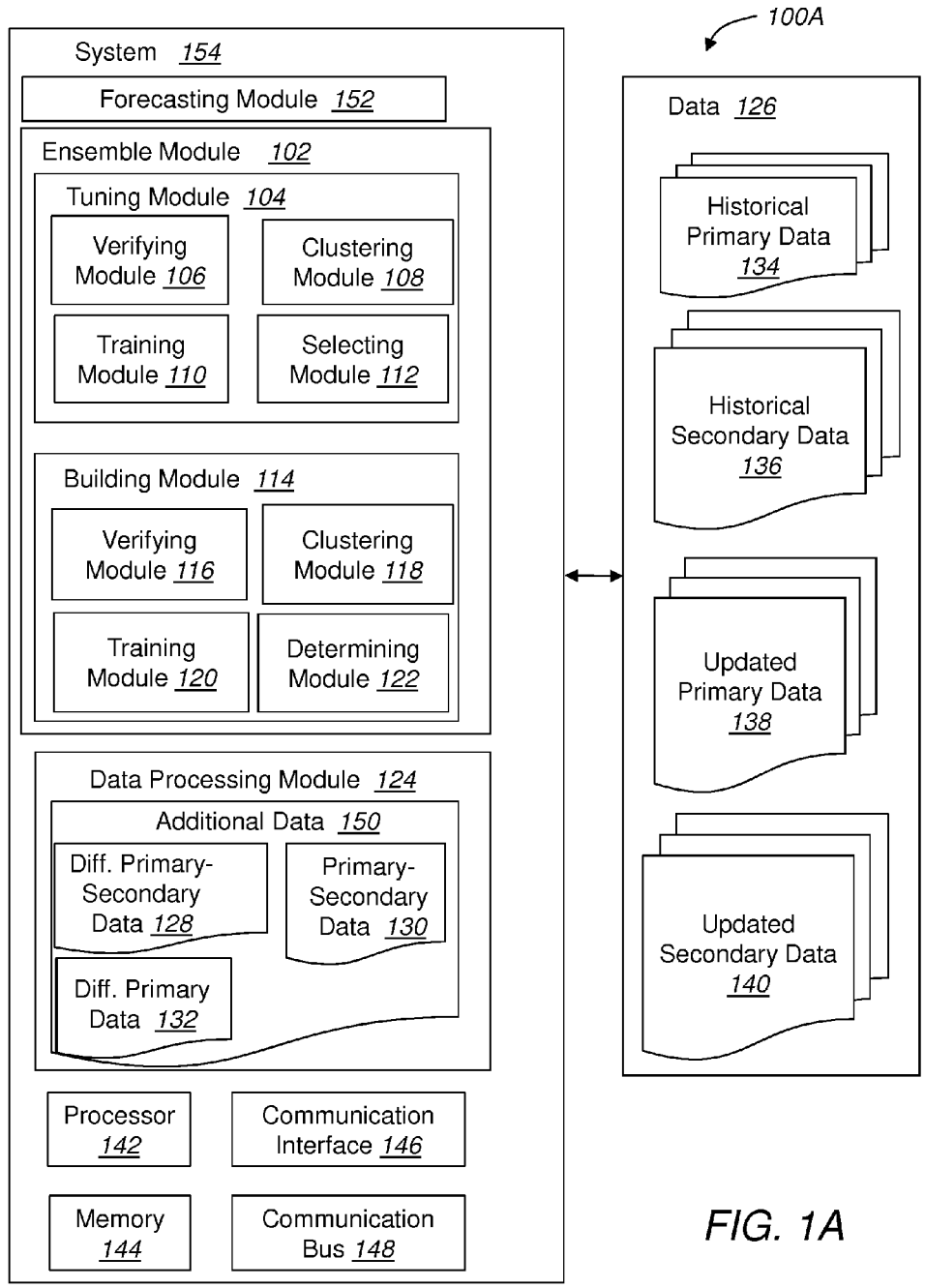
FIGS. 1A and 1B illustrate block diagrams of example forecasting systems.

FIG. 1A is a block diagram 100A of an example forecasting system 154 (hereinafter "system 154"), arranged in accordance with at least one embodiment described herein. The system 154 depicts a general system that may be configured to generate a forecasting ensemble. The forecasting ensemble generated by the system 154 may be implemented to forecast behaviors of a particular entity. For example, the forecasting ensemble may be implemented to forecast electrical loads of a site, other resource loads (e.g., water or gas consumption) of a site, productivity of workers at a site, productivity of a piece of machinery at a site, sales intensity (e.g., money spent or number of transactions) at a site such as a mall, or traffic patterns at a particular location. Furthermore, the forecasting ensemble may be implemented to forecast behaviors specific to relatively short time periods. For example, the forecasting ensemble may be implemented to forecast a behavior over each 15-minute time period (or another defined time period) during a day. Each of these periods during which a behavior is to be forecast is referred to herein as a forecasting interval.

The system 154 is configured to receive data 126 and to forecast a related behavior based thereon. As illustrated, the system 154 may include a processor 142, a communication interface 146, and a memory 144. The processor 142, the communication interface 146, and the memory 144 may be communicatively coupled via a communication bus 148. The communication bus 148 may include, but is not limited to, a memory bus, a storage interface bus, a bus/interface controller, an interface bus, or the like or any combination thereof.

In general, the communication interface 146 may facilitate communications over a network. The communication interface 146 may include, but is not limited to, a network interface card, a network adapter, a LAN adapter, or other suitable communication interface. The data 126 may be communicated to and/or from the system 154 via the communication interface 146, for instance.

The processor 142 may be configured to execute computer instructions that cause the system 154 to perform the functions and operations described herein. The processor 142 may include, but is not limited to, a processor, a microprocessor (μP), a controller, a microcontroller (μC), a central processing unit (CPU), a digital signal processor (DSP), any combination thereof, or other suitable processor.

Computer instructions may be loaded into the memory 144 for execution by the processor 142. For example, the computer instructions may be in the form of one or more modules (e.g., modules 102, 104, 106, 108, 110, 112, 114, 116, 118, 120, 122, 124, and 152). In some embodiments, data generated, received, and/or operated on during performance of the functions and operations described herein may be at least temporarily stored in the memory 144. Moreover, the memory 144 may include volatile storage such as RAM. More generally, the system 154 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

The system 154 is depicted receiving the data 126. Based on the data 126 received by the system 154, an ensemble module 102 may construct a forecasting ensemble of best sub-models particular to an entity. Each of the best sub-models may be used by a forecasting module 152 to forecast an electrical load for a forecast interval.

The data 126 may include, but is not limited to, historical primary data 134, historical secondary data 136, updated primary data 138, and updated secondary data 140. The historical primary data 134 and the updated primary data 138 (collectively, primary data 134/138) may include time series data pertaining to an entity, a group of entities, a piece of machinery, or the like (generally, entity or object). For example, the primary data 134/138 may include, but is not limited to, time series energy usage data pertaining to a site, time series productivity data related to all or a subset of office workers in an office building, traffic patterns at a certain position, time series consumer data related to a mall or store, or time series productivity data related to a piece of machinery in a site.

The primary data 134/138 may be measured locally at the entity or object. Additionally or alternatively, the primary data 134/138 may be measured remotely and then be communicated to the system 154. The primary data 134/138 may generally include a specific or averaged value at or over a particular time.

For example, in embodiments in which the primary data 134/138 includes energy usage data pertaining to a site, the primary data 134/138 may be measured by a smart meter. The energy usage data may be communicated to the system 154 or the system 154 may be included in an entity that receives data from the smart meter. A particular example of the primary data 134/138 in these embodiments may indicate that a specific factory used five kilowatt-hours (kWh) between 7:00 AM and 7:05 AM on May 23, 2013. The primary data 134/138 may be analogously quantified in embodiments in which the primary data 134/138 includes other types of data related to other entities or objects.

The historical primary data 134 may include a data set over a defined period of time. The updated primary data 138 may include a second or subsequent data set after an event or performance of a step in a process. For example, the historical primary data 134 may include energy usage data of a factory over the past six months with a granularity of 15-minute increments or some other time interval. The historical primary data 134 may be used to train a sub-model as described below. In this example, the updated primary data 138 may include energy usage data of the factory since the sub-model was trained. The primary data 134/138 may be analogously organized into historical primary data 134 and updated primary data 138 in embodiments in which the primary data 134/138 includes other types of data related to other entities or objects.

The historical secondary data 136 and the updated secondary data 140 (collectively, secondary data 136/140) may include another time series data set that may be related to the entity or object. The secondary data 136/140 may have an effect on the primary data 134/138. For example, the secondary data 136/140 may include, but is not limited to, time series ambient condition data pertaining to a site, traffic location, an office building, or a mall; a particular condition such as time series temperature data pertaining to a site, a traffic location, an office building, or a mall; or any other condition such as seasonal changes that may affect the primary data 134/138.

The secondary data 136/140 may be measured by an outside entity and may be communicated to the system 154. Additionally or alternatively, the secondary data 136/140 may be measured locally at the system 154. The secondary data 136/140 may include a specific or averaged value of a condition at or over a period of time.

For example, the secondary data 136/140 may include an indoor temperature, outdoor temperature, humidity, wind speed and/or direction, barometric pressure, etc. at or over a particular time. An example of the secondary data 136/140 in these embodiments may indicate that on May 23, 2013 from 7:00 AM to 7:05 AM the outside temperature around the specific factory was 25° C. The secondary data 136/140 may be analogously quantified in embodiments in which the secondary data 136/140 includes other types of data related to other entities or objects.

In some embodiments, the system 154 may include a data processing module 124. The data processing module 124 may be configured to generate additional data 150 from the one or more of the primary data 134/138 and the secondary data 136/140. The data processing module 124 may combine the primary data 134/138 and the secondary data 136/140. For example, the historical primary data 134 for a specific time period may be combined with an ambient condition represented in the historical secondary data 136 during the specific time period. In FIG. 1A, data representing a combination of the primary data 134/138 and secondary data 136/140 is labeled "Primary-Secondary Data 130." By way of example only, the Primary-Secondary Data 130 may include a table, graph, chart, or function that combines primary data 134/138 with secondary data 136/140. The Primary-Secondary Data 130 may represent, for example, load data combined with temperature data, productivity data combined with temperature data, consumer transactional data combined with seasonal data, or any other combination of primary data 134/138 with secondary data 136/140.

Additionally or alternatively, the data processing module 124 may calculate differences between the primary data 134/138 at differing specific times. For example, a difference may be calculated between each datum of the historical primary data 134 and an immediately previous datum of the historical primary data 134. In FIG. 1A, data representing a differenced primary data 134/138 is labeled "Diff. Primary Data 132." The differenced primary data is referred to herein as the Diff. Primary Data 132. By way of example only, the Diff. Primary Data 132 may include a table, graph, chart, or function that differences the primary data 134/138.

Additionally or alternatively, the data processing module 124 may calculate differences between the primary data 134/138 at differing specific times and combine the secondary data 136/140 to the differenced primary data 134/138. For example, a difference may be calculated between each datum of the historical primary data 134 and an immediately previous datum of the historical primary data 134. The difference between the data of the historical primary data 134 may be combined with an ambient condition such as temperature during the time period between the data. In FIG. 1A, data representing differenced primary data 134/138 combined with secondary data 136/140 is labeled "Diff. Primary-Secondary Data 128." The differenced primary data 134/138 combined with the secondary data 136/140 is further referred to herein as Diff. Primary-Secondary Data 128. By way of example only, the Diff. Primary-Secondary Data 128 may include a table, graph, chart, or function that differences the primary data 134/138 and combines the differenced primary data 134/138 with secondary data 136/140. The three examples of the additional data 150 are not meant to be limiting to embodiments described herein.

The ensemble module 102 may use the data 126 and/or the additional data 150 to construct an ensemble of best sub-models. In particular, in some embodiments, the ensemble module 102 may be configured to construct one best sub-model for each forecast interval. Generally, the best sub-model is a sub-model including one or more parameters that are configured to most accurately forecast behaviors for an entity or object at the particular forecast interval. For example, the system 154 may be configured to forecast loads for a 24-hour day at 15-minute intervals, or for some other period of time at some other intervals. Accordingly, the ensemble module 102 may construct 96 best sub-models for the day, or more generally any suitable number of best sub-models.

The ensemble module 102 in FIG. 1A includes a building module 114 and a tuning module 104. The building module 114 and the tuning module 104 may be used to construct each best sub-model from multiple possible sub-models. Generally, to construct each best sub-model, the building module 114 may input a first portion of the data 126 and/or the additional data 150. Based on the first portion, the building module 114 may determine a first subset of clustering parameters and/or sub-model parameters (collectively, parameters) that may be included in the best sub-model. Some additional details of the clustering parameters and the sub-model parameters are provided below.

The tuning module 104 may then input a second portion of the data 126 and/or the additional data 150 into the best sub-model using the first subset of the parameters determined by the building module 114. The tuning module 104 may then select a second subset of parameters that may be included in the best sub-model. After the second subset of parameters is set by the tuning module 104, the ensemble module 102 may combine the best sub-model with other best sub-models. An ensemble of best sub-models may be used by the forecasting module 152 to forecast behaviors. Each of the building module 114 and the tuning module 104 are described in greater detail below.

The building module 114 may include a clustering module 118, a training module 120, a verifying module 116, and a determining module 122. The clustering module 118 may cluster the data 126, the additional data 150, or some portions thereof. Clustering generally refers to grouping subsets of a data set such that the grouped subsets are processed as a unit. The clustering may occur according to one or more clustering algorithms having one or more clustering parameters. Some examples of the clustering parameters may include, but are not limited to, the number of time intervals of the data (e.g., the data 126) grouped together and the type of data, e.g., whether the clustered data includes the historical primary data 134, the Primary-Secondary Data 130, the Diff. Primary Data 132, etc.

In some embodiments, the clustering module 118 may cluster the data 126, the additional data 150, or some portion thereof in parallel. For example, in embodiments in which the additional data 150 includes the Diff. Primary-Secondary Data 128, the Primary-Secondary Data 130, and the Diff. Primary Data 132, the clustering module 118 may cluster each of the historical primary data 134, the Diff. Primary-Secondary Data 128, the Primary-Secondary Data 130, and the Diff. Primary Data 132 in parallel.

The training module 120 may be configured to train possible sub-models using the clustered data. The clustered data may include the clustered portions of the data 126, the additional data 150, or portions thereof. The possible sub-models may include machine learning models configured to optimize load forecasting accuracy. In these and other embodiments, the possible sub-models may include neural networks, autoregressive integrated moving average models (ARIMA), random forest models, double exponential smoothing models, or any other suitable trainable learning model. The possible sub-models may also include one or more sub-model parameters that dictate the output. Using the clustered data, the training module 120 may train the possible sub-models to develop sub-model parameters that provide accurate load forecasting.

The verifying module 116 may be used to verify forecast behaviors output from the possible sub-models. In some embodiments, the forecast behaviors output from the possible sub-models may be verified against verification portions of the data 126, the additional data 150, or portions thereof. Thus, in these and other embodiments, the possible sub-models may be trained with the clustered data until the forecasted behaviors output by the possible sub-models are accurate according to the model. The verifying module 116 may provide an additional verification of the accuracy of the forecasted behaviors by checking the forecasted behaviors output from the possible sub-models against actual data. For example, the data 126 may include historical primary data 134 from a period of Jan. 1, 2013 to Jun. 30, 2013. The possible sub-models may be configured to forecast an electrical load of ten kWh between 7:00 AM and 7:15 AM on May 21, 2013. The verifying module 116 may access the historical primary data 134 from May 21, 2013 and verify whether the possible sub-models accurately forecast the electrical load.

In some embodiments, the verifying module 116 may verify the accuracy of the forecasted behaviors output by the possible sub-models using an error equation. For example, the accuracy of the forecasted behaviors may be determined according to a mean absolute percentage error (MAPE) represented in an example MAPE equation:

$$MAPE = \frac{1}{n}\sum_{t=1}^{n}\left|\frac{P_A - P_F}{P_A}\right| \times 100$$

In the example MAPE equation, the variable MAPE represents the MAPE. The variable n represents a number of time intervals in the data 126, the additional data 150, or some portions thereof. The variable $P_A$ represents measured behavior from the data (e.g., the data 126). The variable $P_F$ represents the forecasted behaviors.

Based on the accuracy of the forecasted behaviors, the determining module 122 may determine a first subset of parameters for a best sub-model. Determining the first subset of parameters may include generating a range of one or more parameters, excluding possible values of one or more parameters, setting a value for one or more parameters, leaving a parameter undetermined, or any combination thereof. For example, the determining module 122 may provide a value for each of one or more sub-model parameters and may provide a range for each of one or more clustering parameters.

In some embodiments, the possible sub-models that output forecasted behaviors with the lowest MAPE and the clustered data used therein may be identified. The sub-model parameters and/or the clustering parameters of the possible sub-models that output forecasted behaviors with the lowest MAPE may be included in the best sub-model.

The building module 114 may accordingly output one or more parameters that may be included in a best sub-model. The tuning module 104 may be similar, at least in some respects, to the building module 114 except the tuning module 104 may be configured to train the best sub-model output by the building module 114 (rather than the possible sub-models) to select a second subset of parameters (rather than the first subset of parameters). In particular, the tuning module 104 may include a clustering module 108, a training module 110, a verifying module 106, and a selecting module 112. The clustering module 108, the training module 110, the verifying module 106, and the selecting module 112 may be substantially similar to the clustering module 118, the training module 120, the verifying module 116, and the determining module 122, respectively. However, the tuning module 104 may receive a second portion of the data 126 and/or the additional data 150 and select a second subset of parameters by training and verifying the best sub-model output from the building module 114.

More specifically, the building module 114 may receive a training portion of the data 126 and/or the additional data 150. The training portion may include a long-term data set that may include, for instance, energy usage data, ambient condition data, and data (e.g., the additional data 150) derived therefrom. In some embodiments, the term "long-term data set" may refer to between about 35 and about 135 days of energy usage data, ambient condition data, and data derived therefrom. In contrast, the tuning module 104 may receive a tuning portion of the data 126 and/or the additional data 150. The tuning portion may include a short-term data set that may include, for instance, short-term energy usage data, ambient condition data, and data derived therefrom. In some embodiments, the term "short-term data set" may refer to between about three and about seven days of energy usage data, ambient condition data, and data derived therefrom.

The building module 114 may train the possible sub-models with essentially no parameters set. Accordingly, the training module 120 of the building module 114 may perform a training process using a relatively large data set (when compared to the tuning module 104). In contrast, the tuning module 104 may train and verify the best sub-model output from the building module 114 with the first subset of parameters determined. The tuning module 104 may select the second set of parameters while using the first set of parameters determined by the building module 114. Thus, the best sub-model output from the tuning module 104 may include the parameters including a first subset that are determined by the building module 114 and/or a second subset of parameters selected by the tuning module 104.

The tuning module 104 may thus function in a general sense similarly to the building module 114. For example, the clustering module 108 may cluster in parallel the data 126, the additional data 150, or some second portions thereof. The training module 110 may train the best sub-model output by the building module 114 using the clustered data output from the clustering module 108. The verifying module 106 may verify forecasted behaviors output from the best sub-model. In some embodiments, the verifying module 106 may measure accuracy of the forecasted behaviors using MAPE. The selecting module 112 may select a second subset of parameters for the best sub-model based upon accuracy of the forecasted behaviors. Selecting the second subset of parameters may include generating a range of one or more parameters, excluding possible values of one or more parameters, setting a value for one or more parameters, leaving one or more parameters undetermined, leaving one or more parameters as determined by the determining module 122, or any combination thereof.

The best sub-model including the first and second subset of parameters may be output from the tuning module 104. Additionally, the tuning module 104 may output a best sub-model for each forecasting interval. The best sub-model for each forecasting interval may be combined by the ensemble module 102. The forecasting module 152 may use a forecasting ensemble of best sub-models to forecast behaviors for an entity or object.

In some embodiments, the ensemble module 102 may be configured to periodically re-construct the ensemble of best sub-models. In these and other embodiments, the tuning module 104 may be configured to update the second subset of parameters, by subsequently tuning the best sub-model previously output by the tuning module 104. Updating the second subset of parameters may be based on the updated primary data 138 and/or the updated secondary data 140, which may be processed in the tuning module 104 using the best sub-model previously output from the tuning module 104. The tuning module 104 may accordingly perform the process described above using a third portion of the data 126 and/or the additional data 150 derived therefrom. The third portion may be referred to as a subsequent tuning portion. The subsequent tuning portion may include updated energy usage data from about three to about seven days in some embodiments.

The process of updating the second subset of parameters may include the data processing module 124 updating the additional data 150 using updated primary data 138 and the updated secondary data 140. Additionally, the clustering module 108 may cluster a subsequent tuning portion of the updated primary data 138 and a subsequent tuning portion of the updated additional data 150. Additionally, the training module 110 may train the best sub-model previously output from the tuning module 104 using the clustered updated tuning portions of the historical primary data 134 and/or the additional data 150. Additionally, the verifying module 106 may verify updated forecasted behaviors output from the best sub-model against updated verification portions of the updated primary data 138 and the updated additional data 150 and the selecting module 112 may update the second subset of parameters for the best sub-model based upon accuracy of the updated forecasted behaviors.

The updated second subset of parameters may be included in the best sub-model. As above, the best sub-model, which may include the updated second subset of parameters for each forecasting interval, may be combined with other updated best sub-models by the ensemble module 102. The forecasting module 152 may use the ensemble of the updated best sub-models to forecast behaviors.

In some embodiments, the best sub-model may be initially constructed, including the building and the tuning, according to a first schedule and the subsequent tuning may be performed according to a second schedule. Thus, the best sub-model may be constructed and then subsequently updated according to the second schedule. For example, the best sub-model may be initially constructed periodically or randomly, such as about every about three to about six months and the subsequent tuning may be performed on a daily or weekly basis or according to some other periodic or random interval.

The system 154 may be implemented in a variety of applications, systems, and circumstances, some of which are mentioned herein. Generally, the data 126 and/or the additional data 150 derived therefrom may vary with the particular application. Additionally, the behavior that is forecasted using the forecasting ensemble generated by the ensemble module 102 may differ based on the particular application.

Figure 1B:
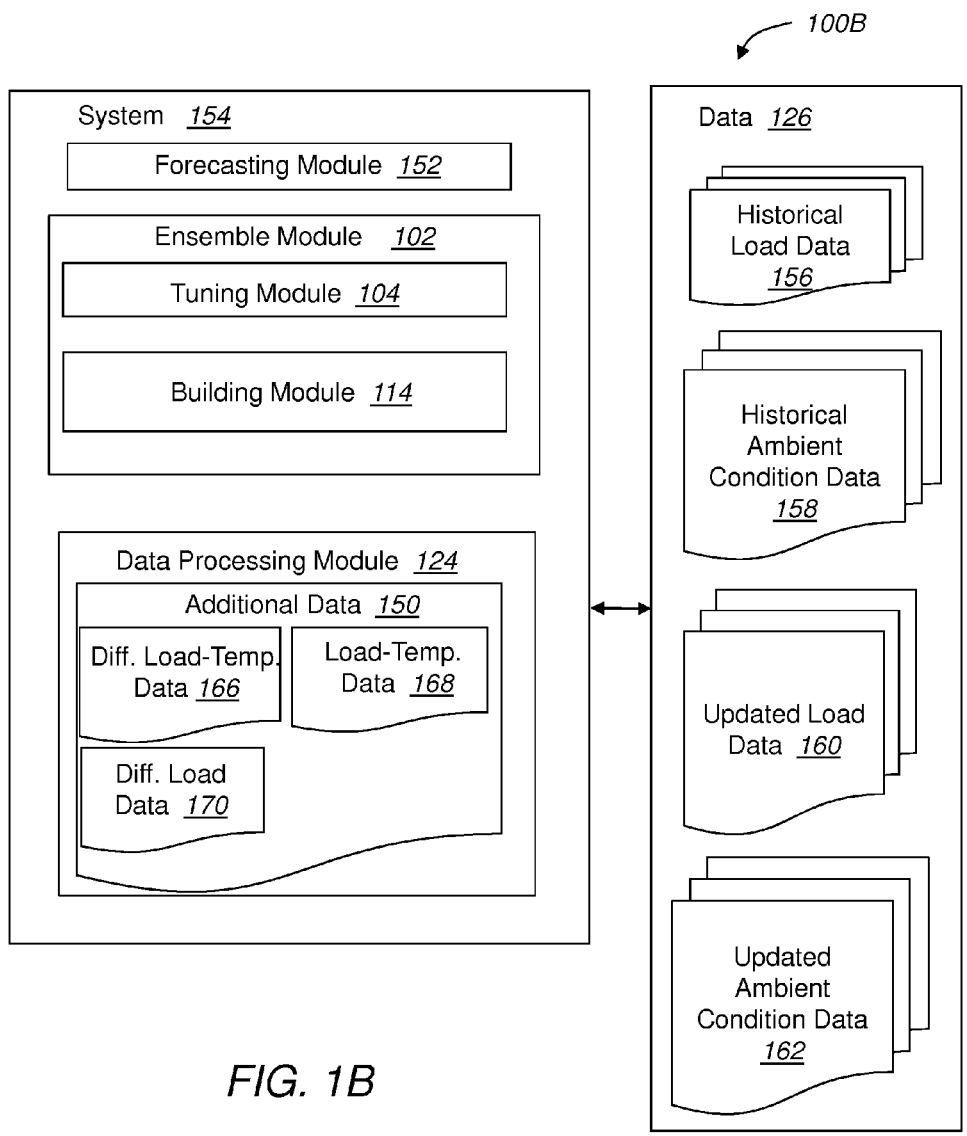

FIG. 1B illustrates a block diagram 100B of an example embodiment of the system 154 configured to forecast electrical loads particular to a site. The modules (e.g., 102, 104, 114, and 124) included in FIG. 1B are substantially similar and/or may correspond to the modules (e.g., 102, 104, 114, and 124) discussed with reference to FIG. 1A, although some features of the module are omitted in FIG. 1B. Additionally, although not depicted in FIG. 1B, the system 154 of FIG. 1B may include one or more of the processor 142, the communication interface 146, the memory 144, the communication bus 148, or some combination thereof described with reference to FIG. 1A. In this and other embodiments, the data 126 may include, but is not limited to, historical load data 156, historical ambient condition data 158, updated load data 160, and updated ambient condition data 162. The historical load data 156 may correspond to the historical primary data 134, the historical ambient condition data 158 may correspond to the historical secondary data 136, the updated load data 160 may correspond to the updated primary data 138, and the updated ambient condition data 162 may correspond to the updated secondary data 140.

Additionally, the additional data 150 may include load data (e.g., the historical load data 156 and/or the updated load data 160) combined with ambient condition data (the historical ambient condition data 158 and/or the updated ambient condition data 162). A particular example may include load data combined with temperature data, which is represented in FIG. 1B as "Load-Temp. Data 168." Additionally or alternatively, the additional data 150 may include differenced load data, which is represented in FIG. 1B by "Diff. Load Data 170." Additionally or alternatively, the additional data 150 may include differenced load data combined with the ambient condition data. A particular example may include differenced load data combined with temperature data, which is represented in FIG. 1B as "Diff. Load-Temp Data 166."

Consistent with the embodiment depicted in FIG. 1A, the system 154 of FIG. 1B may construct a forecasting ensemble configured to forecast an electrical load of a site and may forecast the electrical loads of a site. Specifically, the data processing module 124 may receive the historical load data 156 and/or the historical ambient condition data 158. The historical load data 156 and/or the historical ambient condition data 158 may be time series data pertaining to a site. For example, the historical load data 156 may include the energy usage data of the site at or during a specified time period. The data processing module 124 may generate the additional data 150 from one or more of the received historical load data 156 and/or the received historical ambient condition data 158. The ensemble module 102 may build a best sub-model for each forecast interval. The building module 114 may cluster in parallel a training portion of the historical load data 156 and/or a training portion of the additional data 150. The building module 114 may then train possible sub-models using the clustered training portions of the historical load data 156 and/or the additional data 150. The building module 114 may verify forecasted loads output from the possible sub-models against verification portions of the historical load data 156 and/or the additional data 150. The building module 114 may determine a first subset of parameters for the best sub-model based upon accuracy of the forecasted loads.

Each of the best sub-models built for each of the forecast intervals may be tuned by the tuning module 104. The tuning module 104 may cluster in parallel a tuning portion of the historical load data 156 and/or a tuning portion of the additional data 150. The tuning module 104 may train the best sub-model output by the building module 114 using the clustered tuning portions of the historical load data 156 and/or the additional data 150. The tuning module 104 may then verify forecasted loads output from the best sub-model against second verification portions of the historical load data 156 and the additional data 150. Based upon accuracy of the forecasted loads, the tuning module 104 may then select a second subset of parameters for the best sub-model. The tuning module 104 may also subsequently tune the best sub-model as described above using the updated load data 160 and/or the updated ambient condition data 162.

FIGS. 2-6 generally relate to an example operating environment that may include the systems 154 of FIGS. 1A and/or 1B and block diagrams of processes that may be performed by the system 154 to forecast electrical loads. The systems and diagrams of FIGS. 2-6 are intended to provide some details of example embodiments of the processes described with reference to FIGS. 1A and 1B. The example operating environment and the block diagrams of processes that may be performed by the system 154 may be analogously applicable to other systems 154 that may be implemented to predict behaviors including, but not limited to, resource loads (e.g., water or gas consumption) of a site, productivity of workers at a site, productivity of a piece of machinery at a site, sales intensity (e.g., money spent or number of transactions) at a site such as a mall, or traffic patterns at a particular location.

Figure 2:
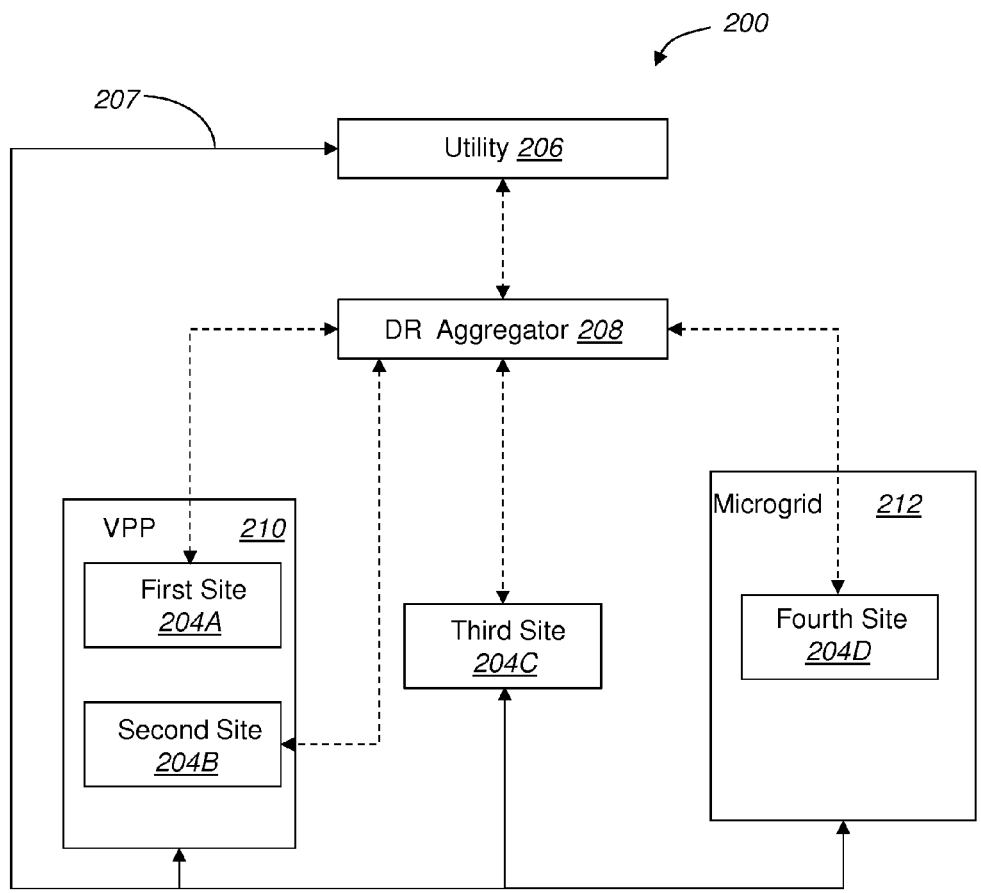
FIG. 2 is a block diagram of an example electrical distribution system in which the forecasting systems of FIGS. 1A and 1B may be implemented.

FIG. 2 is a block diagram of an example electrical distribution system (distribution system) 200, arranged in accordance with at least one embodiment described herein. In the distribution system 200, electrical loads for one or more sites 204A-204D (generally, site 204 or sites 204) may be forecast. In particular, the electrical loads of a single site 204 or a few sites 204, such as those sites 204A and 204B included in a virtual power plant (VPP) 210, may be forecast for one or more forecast intervals. For example, the electrical load of a third site 204C may be forecast for each 15-minute forecast interval of a specific day, and/or for intervals of greater or less than 15 minutes in duration. Forecasting the electrical loads specific to the site 204 (or a few sites 204) may improve energy management of the site 204 and may improve supply balancing in the distribution system 200. Additionally, the electrical load forecasts may be used in an analysis associated with demand response (DR) events and/or site participation in DR events. For example, the DR events may include specified time periods during which one or more of the sites 204 curtail energy usage. A DR aggregator 208 may base a decision on which sites 204 to include in a DR event based on a forecasted load of the sites 204.

Generally, the distribution system 200 may include a utility 206, the DR aggregator 208, and the sites 204. The system 154 of FIGS. 1A and/or 1B may represent or be included in one or more of the utilities 206, the DR aggregator 208, one or more of the sites 204 of FIG. 2, or another system (not shown) which may be configured to forecast electrical loads. Some of the sites 204 may be organized into the VPP 210 and/or a microgrid 212. In the distribution system 200, the utility 206 may distribute electricity to the sites 204. Additionally, in some embodiments, the VPP 210 and/or one or more of the sites 204 may generate electricity and supply the generated electricity to other sites 204 or to the utility 206. The distribution of the electricity to the sites 204 by the utility 206 is represented in FIG. 2 by a line designated by item number 207.

As the electricity is distributed to the sites 204, the electricity may be metered or otherwise measured. The measured electricity that is distributed to the sites 204 may be saved as or otherwise included in historical load data such as the historical load data 156 of FIG. 1B. The historical load data may be updated as electricity is distributed to the sites 204 over time. For example, in some embodiments, each of the sites 204, the VPP 210, the microgrid 212, or any combination thereof may include a smart meter (not shown). The smart meter may enable measurement and/or collection of data representative of the electricity provided to each of the sites 204, the VPP 210, the microgrid 212, or any combination thereof. Some additional details of each of the components (e.g., 204, 206, 208, 210, and 212) are provided below.

The utility 206 may include any entity involved in production, transmission, and/or distribution of electricity. The utility 206 may be publicly or privately owned. Some examples of the utility 206 may include, but are not limited to, a power plant, an energy cooperative, and an independent system operator (ISO).

In general, the sites 204 may be buildings, structures, equipment, or other objects that consume electricity generated by the utility 206. The sites 204 may include multiple types of structures, buildings, equipment, or other objects that consume electricity ranging from private residences to large industrial factories or office buildings. The sites 204 may be organized or otherwise grouped into the VPP 210 or may be included in the microgrid 212, for instance. The VPP 210 may include sets of electricity producers and/or sites 204 that may appear as a single load and/or a single generation unit. The microgrid 212 may include one or more sites 204 that may be able to function (e.g., meet electricity demand) as a unit disconnected from the rest of the distribution system 200. While the embodiments are described herein with particular reference to the sites 204, the embodiments may also be applicable to the VPP 210 and/or to the microgrid 212.

The DR aggregator 208 may act as an intermediary between the utility 206 and the sites 204, the VPP 210, and/or the microgrid 212 to coordinate implementation of one or more DR events. In particular, the DR aggregator 208 may coordinate DR events such that a cumulative electricity usage curtailment by the sites 204, the VPP 210, and/or the microgrid 212 is sufficient to meet an overall electricity curtailment of a DR event.

The DR aggregator 208 may be communicatively coupled to the utility 206 and the sites 204. In FIG. 2, the communicative coupling between the DR aggregator 208, the utility 206, and the sites 204 is represented by dashed arrows. The utility 206, the DR aggregator 208, and the sites 204 may be communicatively coupled via one or more wired or wireless networks. For instance, the networks may include the internet, mobile communication networks, one or more local area or wide area networks (LANs or WANs), any combination thereof, or any similar networking technology.

The sites 204 or some subset thereof may be managed by the DR aggregator 208. The DR aggregator 208 may specifically coordinate implementation of DR events by the sites 204 it manages. The DR aggregator 208 may accordingly be interested in forecasting loads of sites 204 to determine which sites 204 are likely to participate in an upcoming DR event. Additionally, the sites 204 may have the option to participate in an upcoming DR event. The sites 204 may accordingly be interested in forecasting the electrical load during an upcoming DR event to ascertain whether participation is beneficial.

In the distribution system 200, forecasting the loads of the sites 204 may be performed by the sites 204, the utility 206, the DR aggregator 208, or another entity (not shown). Accordingly, forecasting the loads may be performed locally and/or via a communication network. For example, an entity may be hired to perform load forecasting by one of the sites 204 or may otherwise perform load forecasting for a corresponding one of the sites 204. The entity may perform some or all of the forecasting via a cloud-based service and communicate the results to the sites 204. Additionally or alternatively, the sites 204, the utility 206, and/or the DR aggregator 208 may include systems such as processors, memory, servers, and communication interfaces used to forecast electrical loads locally.

The distribution system 200 is described herein with particularity in which the utility 206 provides electricity to the sites 204. However, the distribution system 200 is not limited to an electrical system. The distribution system 200 may be a system in which another resource, such as gas, water, or any other utility or resource is provided to the sites 204. Moreover, as mentioned above, the embodiments included herein describing forecasting of electrical loads may be applied to the forecasting of other behaviors, such as forecasting productivity of an office, forecasting vehicle traffic at a particular point, and forecasting consumer demand, without limitation.

Modifications, additions, or omissions may be made to the distribution system 200 without departing from the scope of the present disclosure. For example, while FIG. 2 depicts first, a second, a third, and a fourth site 204A-204D, one VPP 210, and one microgrid 212, the present disclosure applies to a system architecture having one or more sites 204, one or more VPPs 210, one or more microgrids 212, or any combination thereof. Furthermore, while FIG. 2 includes one DR aggregator 208 and one utility 206, the distribution system 200 may include multiple DR aggregators and/or multiple utilities. Additionally, in some embodiments, one or more of the sites 204 may be served by multiple DR aggregators and/or multiple utilities.

Figure 3:
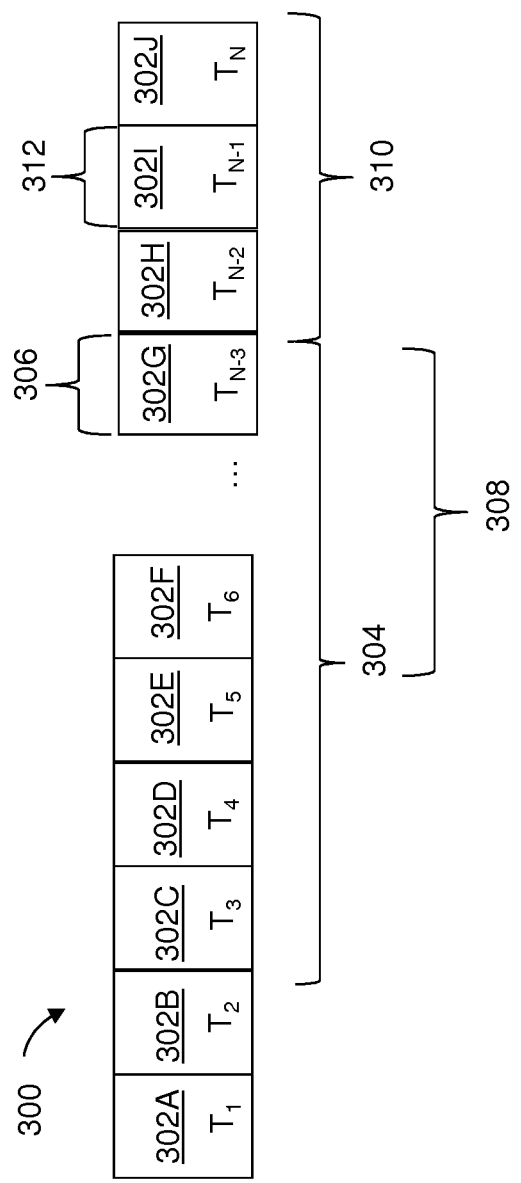
FIG. 3 illustrates an example time series data set that may be processed in the forecasting systems of FIGS. 1A and 1B.

FIG. 3 illustrates an example time series data set (data set) 300 that may be processed in the system 154 described with reference to FIGS. 1A and/or 1B. The data set 300 may represent, for example, data set of the primary data 134/138, the secondary data 136/140, or the additional data 150 of FIG. 1A. Additionally or alternatively, the data set 300 may represent the historical load data 156 and updated load data 160, the historical ambient condition data 158 and the updated ambient condition data 162, or the additional data 150 described with reference to FIG. 1B. FIG. 3 is described with combined reference to FIGS. 1A and 1B.

The data set 300 includes individual data 302-302J (generally, data 302 or datum 302) having time increments labeled in FIG. 3 as $T_1$-$T_N$. In some embodiments, the data set may include a training portion 304. The training portion 304 may include a set of the data 302 that has occurred between an initial training datum 302C at time $T_3$ and a final training datum 302G at time $T_{N-3}$.

Selection of the initial training datum 302C at time $T_3$ is meant to illustrate that the initial training datum 302C may or may not include a first training datum 302A of the data set 300. Specifically, in some circumstances, the training portion 304 of the data set 300 may omit data 302 that is some number of time intervals before a time for which a load is to be forecast. For example, in some circumstances seasonal variations may impact loads of a site. Accordingly, if a data set 300 include data 302 from a past summer, the training portion 304 may omit the data 302 from the past summer and only include more recent data 302.

The training portion 304 may include a relatively large portion of the data set 300 and may represent a portion of the data 126 or additional data 150 used to train the possible sub-models by the training module 120 of the building module 114. In some embodiments, one of the parameters determined by the building module 114 may be a size of the training portion 304.

The data set 300 may also include a tuning portion 308. Generally, the tuning portion 308 includes a smaller set of the data 302 than the training portion 304. The tuning portion 308 may be a portion of the data 126 used by the training module 110 of the tuning module 104. In some embodiments, the training portion 304 and the tuning portion 308 may be selected to include the data 302 just prior to a time interval for which a load (or another behavior) is forecast. For example, in the depicted embodiment, the training portion 304 and the tuning portion 308 may be selected to forecast a load during a forecast interval corresponding to the datum 302H at time $T_{N-2}$. In some embodiments, one of the parameters determined by the tuning module 104 may be a size of the tuning portion 308.

Included in the training portion 304 and/or the tuning portion 308 may be verification portion 306. The verification portion 306 may include one or more of the data 302 used to measure the accuracy of forecasted loads generated during the building or tuning of the best sub-model. For example, the verification portion 306 may be used to measure the accuracy of forecast loads output by the possible sub-models. Additionally or alternatively, the verification portion 306 may be used to measure the accuracy of forecast loads output by the best sub-model generated by the building module 114. Specifically, in some embodiments, during the training, the training modules 110 or 120 may be configured to forecast a load for the data 302 included in the verification portion 306. The verifying modules 106 and 116 may be configured to extract the verification portion 306 and measure the accuracy between the verification portion 306 and the forecasted load. In the depicted embodiment, the verification portion 306 includes the final training datum 302G, although the verification portion 306 may alternatively or additionally include other data 302. Additionally, while the verification portion 306 is depicted as being common to the training portion 304 and the tuning portion 308, the tuning portion 308 may include a verification portion 306 and the training portion 304 may include a different verification portion 306. The verification portion 306 may be separate for the training portion 304 and the tuning portion 308.

The data set 300 may also include a subsequent tuning portion 310. The subsequent tuning portion 310 may include data 302 that occurs following the final training datum 302G. The subsequent tuning portion 310 may include updated data such as the updated primary data 138 and/or the updated secondary data 140. The subsequent tuning portion 310 may have been added to the data set 300 after the training portion 304 and/or the tuning portion 308 was processed by the system 154. The subsequent tuning portion 310 may include a verification portion 312, which may be used during subsequent tuning of the best sub-models, for example.

Figure 4:
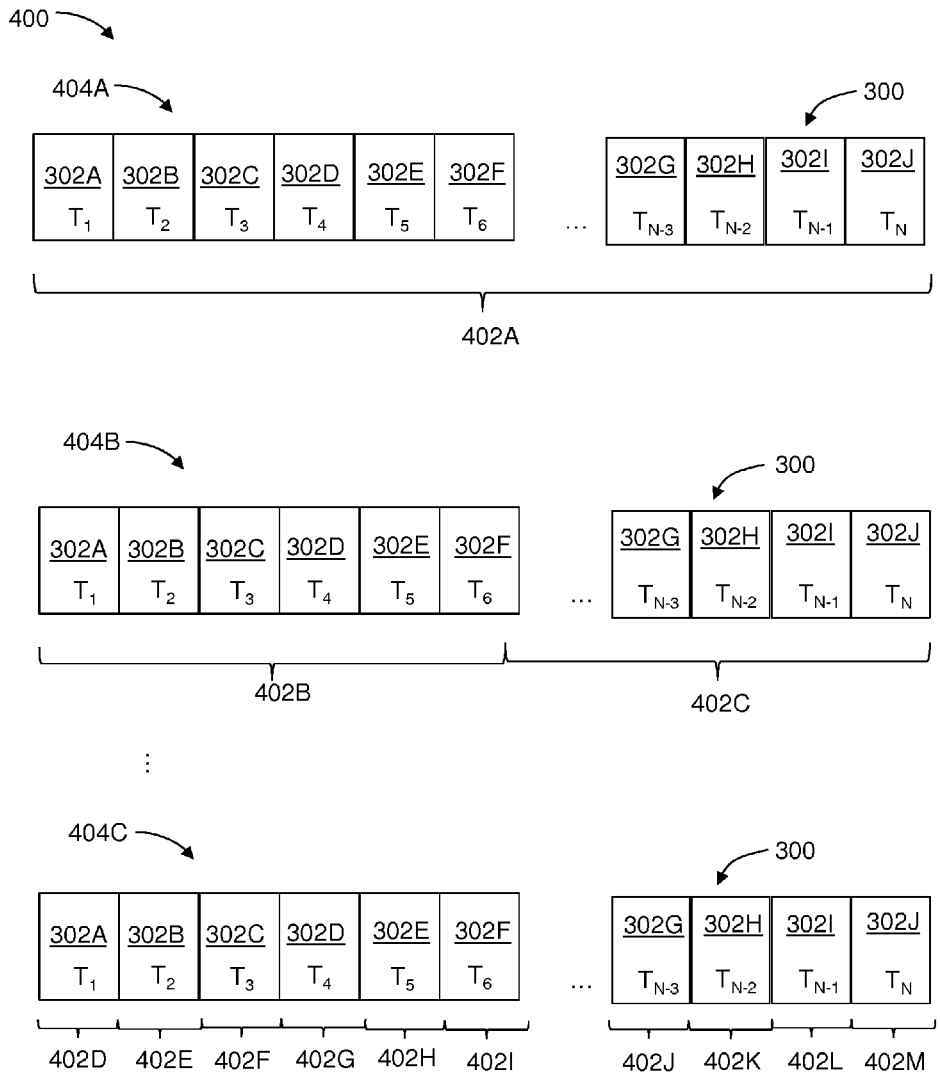
FIG. 4 illustrates an example clustering that may be performed by the forecasting systems of FIGS. 1A and 1B.

FIG. 4 illustrates an example clustering 400 that may be performed by the system 154 of FIGS. 1A and/or 1B. The depicted clustering 400 includes clustering of the data set 300 of FIG. 3 according to a K-means algorithm. The depicted clustering 400 is not meant to be limiting to embodiments discussed herein. Other clustering algorithms may be used to cluster the data set 300. For example, in some alternative embodiments, the clustering may be performed according to a connectivity model such as hierarchical clustering, fuzzy clustering, a distribution model such as multivariate normal distributions, or according to other suitable clustering algorithm(s).

In K-means clustering, a value of a variable K may determine the number of clusters 402A-402M (generally, cluster 402 or clusters 402) into which the data set 300 is separated. Generally, the value of K may range from one to a number of time intervals in the data set 300 and/or a number time intervals in a forecasting interval. For example, a data set separated into days from 8 AM to 8 PM at 30-minute intervals may include 25 time intervals. Thus, the value of the variable K may vary from one to 25.

In the depicted embodiment, for example, the variable K may range from 1 to N. As shown in a first clustering 404A, when the value of the variable K is 1, the data set 300 is clustered into a single cluster 402A. When the variable K is 2, as shown in a second clustering 404B, the data set 300 is clustered into two clusters 402B and 402C. When the variable K is equal to N, each of the data 302A-302J may be clustered into clusters 402D-402M. Data 302 in a cluster 402 is considered similar. Thus, varying the variable K varies the data 302 and the computational overhead.

As mentioned above and with combined reference to FIGS. 1A, 1B, and 4, the clustering 400 of FIG. 4 and/or using other suitable clustering algorithm(s) may be used to cluster multiple data sets (e.g., data set 302) in parallel. For example, the clustering 400 may be used to cluster each of the historical load data 156, the Diff. Load-Temp. Data 166, the Load-Temp. Data 168, and the Diff. Load Data 170 in parallel. The value of the variable K and/or the data set (e.g., the historical load data 156, the Diff. Load-Temp. Data 166, the Load-Temp. Data 168, and the Diff. Load Data 170) used in the best sub-model may be clustering parameters when the clustering is performed according to a K-means clustering algorithm.

Figure 5:
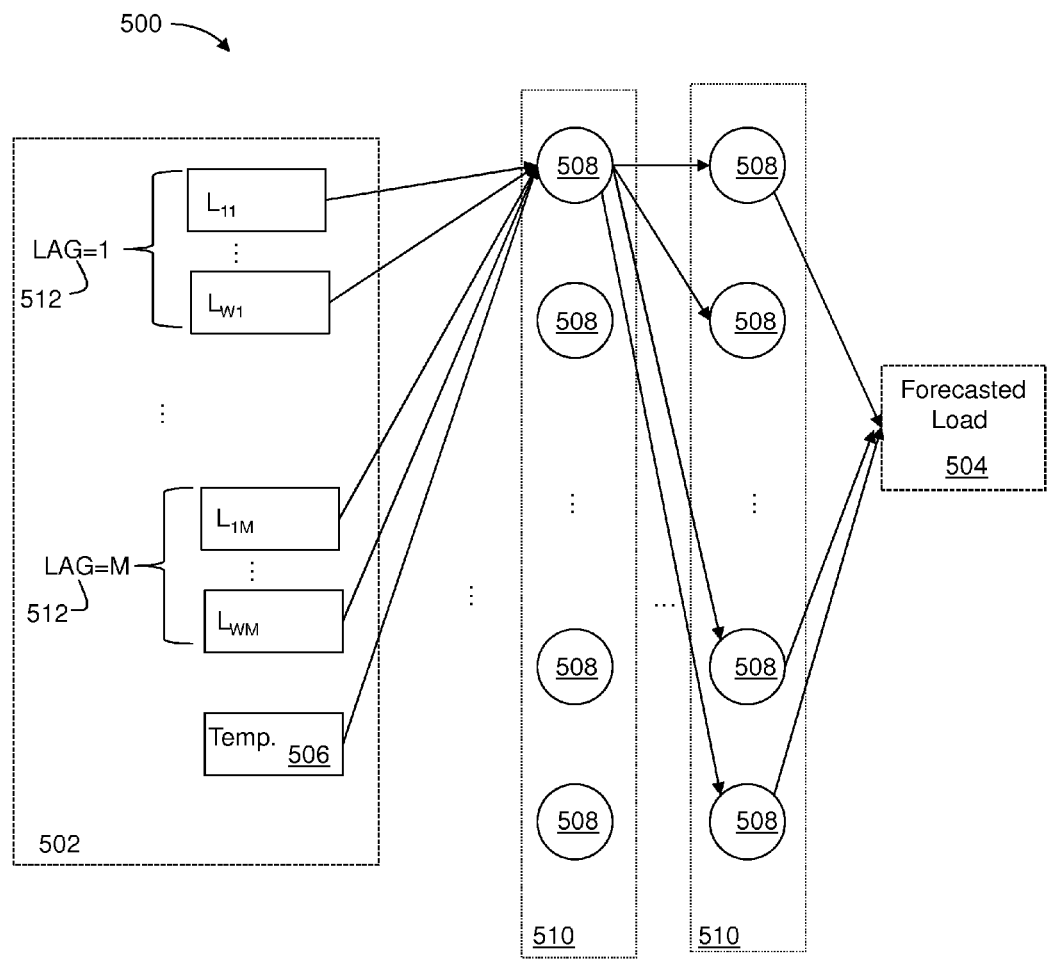
FIG. 5 illustrates an example sub-model that may be implemented in the forecasting systems of FIGS. 1A and 1B.

FIG. 5 illustrates an example sub-model 500 that may be implemented in the system 154 of FIGS. 1A and 1B. The sub-model 500 is a neural network being trained using cluster data such as the clustered data in one of the clusterings 404 of FIG. 4. The sub-model 500 implemented by the system 154 is not limited to a neural network, as other suitable trainable learning sub-models may be used.

With combined reference to FIGS. 4 and 5, the sub-model 500 may be built for each of the clusterings 404 of FIG. 4. For example, there may be a sub-model 500 for the first clustering 404A, another sub-model 500 for the second clustering 404B, and another sub-model 500 for the third clustering 404C.

Generally, the sub-model 500 of FIG. 5 may receive input 502 and may output forecasted loads 504. In some alternative embodiments in which other behaviors are forecast, the sub-models 500 may instead output other forecasted behaviors. As the sub-model 500 is trained on the input 502, a structure of the sub-model 500 may change. For example, in the depicted sub-model 500, one or more neurons 508 in one or more hidden layers 510 may be included in the structure. The neurons 508 may include weighting factors, for example, which may be applied to the input 502 during the determination of the forecasted load 504. In the depicted sub-model 500 a set of arrows are included to illustrate communication of the input 502 through the neurons 508. The set of arrows may only represent a portion of the total communication of the input 502 through the sub-model 500.

The input 502 may include load values, which are generally labeled "L" in FIG. 5. The load values L may include load data of the clustering 404 used to train the sub-model 500. As the sub-model 500 is trained, the weights included in the neurons 508 associated with each of the load values L may change and/or may be combined such that the sub-model 500 may use the load values L to determine the forecasted load 504.

Additionally or alternatively, the sub-model 500 may include a lag value 512. When the forecasted load 504 is for a specific time, the lag value 512 may indicate a number of time increments before the specific time of the corresponding load value L. For example, if the forecasted load 504 is for May 25, 2013 and the lag value 512 is equal to five days, then the input to the sub-model 500 may include a load value L from five days before May 25, 2013, i.e., the load data from May 20, 2013.

More generally, the sub-model 500 depicted in FIG. 5 may be trained using a clustering 404 including W load values per cluster 402. Additionally, the sub-model 500 may be trained using a clustering 404 including M clusters 402. The subscript associated with the load value L represents a specific load value and the lag value 512. For example, the load value $L_{11}$ represents a first load value with a lag value 512 of 1. The load value $L_{W1}$ represents a Wth load value with a lag value of 1. The load value $L_{1M}$ represents a first load value with a lag value 512 of M. The load value $L_{WM}$ represents a Wth load value with a lag value 512 of M. The ellipses indicate that each value between the depicted values may also be included in the input 502.

Additionally or alternatively, the input 502 may include another input 506. In the depicted embodiment, the other input 506 may include temperature data (in FIG. 5, the temperature data is labeled "Temp."), which may be included in the historical ambient condition data 158, the updated ambient condition data 162, or the secondary data 136/140 of FIGS. 1A and 1B, for instance. The other input 506 may be weighted and/or combined by the neurons 508 to determine the forecasted loads 504.

With combined reference to FIGS. 1A, 1B, and 5, in embodiments in which the sub-model 500 is trained by the training modules 120 and/or 110, the sub-model parameters may include a number of hidden layers 510; a number of neurons 508; a number of neurons 508 per hidden layers 510; a lag value 512, which may be related to a size of a training portion, or any other parameter that determines the structure of the sub-model 500.

Figure 6:
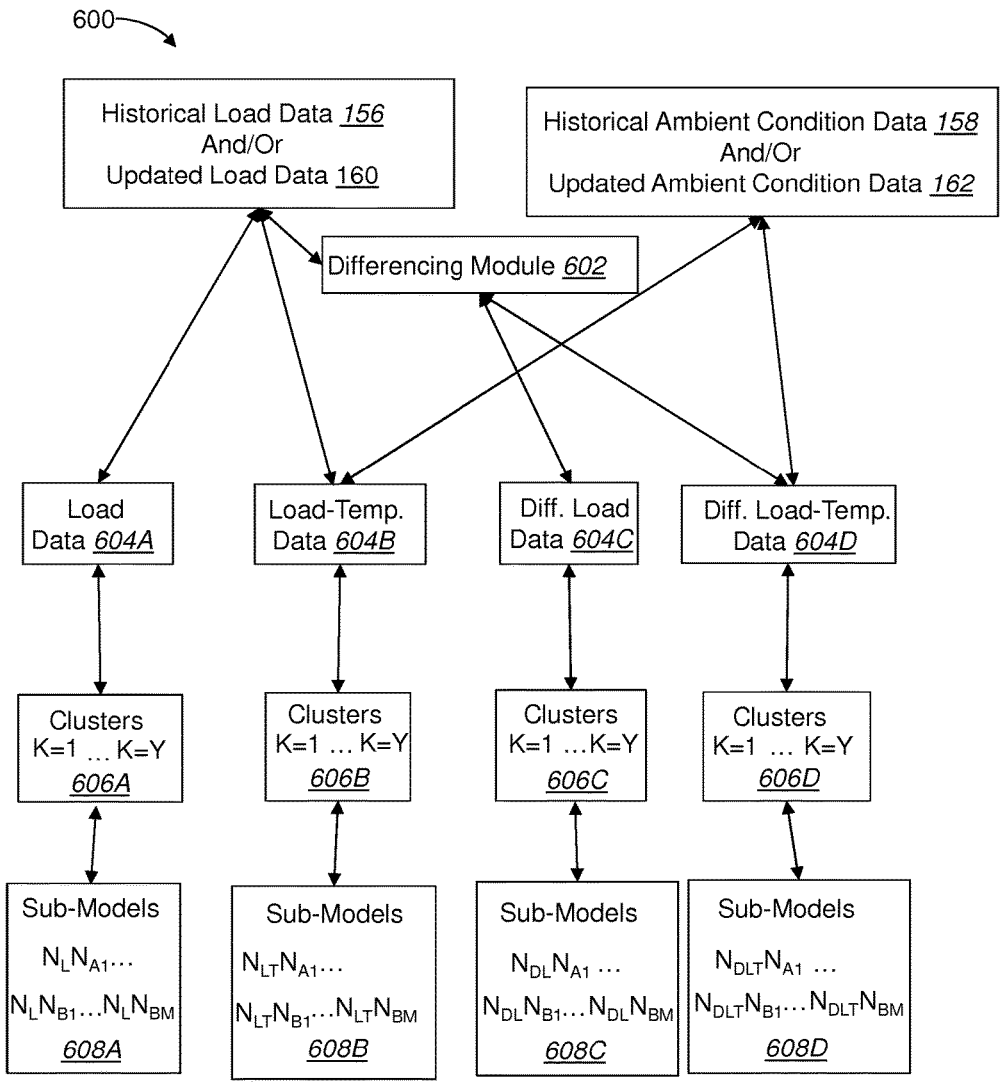
FIG. 6 illustrates a block diagram of an example sub-model construction that may be implemented in the forecasting systems of FIGS. 1A and 1B.

FIG. 6 illustrates a block diagram of an example sub-model construction 600. Generally, the sub-model construction 600 may generate sub-models 608A-608D (generally, sub-model or sub-models 608) and clusters 606A-606D (generally, cluster 606 or clusters 606). The sub-models 608 and the clusters 606 may be based upon data 604A-604D (generally, data 604) derived from one or more of the historical load data 156, the updated load data 160, the historical ambient condition data 158, and the updated ambient condition data 162 discussed with reference to FIG. 1B. In some alternative embodiments in which other behaviors are forecast, the sub-models 608 and the clusters 606 may be based upon the primary data 134/138 and/or the secondary data 136/140.

The sub-model construction 600 may represent one or more processes conducted by the data processing module 124, the building module 114, the tuning module 104 of FIGS. 1A and/or 1B, or some combination thereof. For example, the sub-model construction 600 may represent the generating of the additional data 150 by the data processing module 124 and the clustering the data 126 and/or the additional data 150 by the clustering modules 108 and 118, or the construction of possible sub-models, for instance.

In FIG. 6, the historical load data 156, the updated load data 160, the historical ambient condition data 158, the updated ambient condition data 162, or some combination thereof may be included or combined to be included in the data 604. Specifically, in this and other embodiments, the data 604 includes load data 604A, Load-Temp. Data 604B, the Diff. Load Data 604C, and the Diff. Load-Temp. Data 604D. The load data 604A may include the historical load data 156 and/or the updated load data 160. The Load-Temp. Data 604B, the Diff. Load Data 604C, and the Diff. Load-Temp. Data 604D may be substantially similar to the Load- Temp. Data 168, the Diff. Load Data 170, and the Diff. Load-Temp. Data 166. In some alternative embodiments in which other behaviors are forecast, the data 604 may include the primary data 134/138, the Diff. Primary-Secondary Data 128, the Primary-Secondary Data 130, the Diff. Primary Data 132 described with reference to FIG. 1A, or some combination thereof. In FIG. 6 instead of or in addition to the data processing module 124, a differencing module 602 may be included to perform a differencing operation.

Each of the data 604 may be clustered in parallel to generate the clusters 606. The clusters 606 may include at least one cluster for each of the data 604 and for each value of the variable K from 1 to a number of time increments. The number of time increments is represented in FIG. 6 by a variable Y. If the number of time increments is equal to 12, then the clusters 606A based on the load data 604A may include 12 clusters having a value of the variable K from one to 12. Likewise the clusters 606B based on the Load-Temp. Data 604B may include 12 clusters having a value of the variable K from one to 12. For the Diff. Load Data 604C and the Diff Load-Temp. Data 604D, the number of clusters in the corresponding clusters 606 may also equal 12. Accordingly, a total number of clusters 606 may be equal to a number of types of data multiplied by the number of time increments.

The sub-models 608 may include a sub-model generated for each of the clusters 606. In some embodiments, the sub-models may be neural networks as discussed with reference to FIG. 5. The subscripts of the sub-models in FIG. 6 are intended to indicate the type of sub-model, the load value iterations, and the lag value iterations. Specifically, sub-models 608A are labeled $N_L N$, which may indicate the sub-models represent clusters 606A based on the load data 604A. Likewise, sub-models $N_{LT}N$, $N_{DL}N$, and $N_{DLT}N$ represent clusters 606B, 606C, and 606D based on the Load-Temp. Data 604A, the Diff. Load Data 604C, and the Diff. Load-Temp. Data 604D, respectively.

Additionally, the sub-models 608 include a subscript indicating a load value and a lag value. For example, sub-models 608A generated from the load data 604A may be derived from the clusters 606A. One of the clusters 606A may be generated when the value of the variable K is equal to one. Accordingly, the sub-models 608A may include one sub-model $N_L N_{A1}$ for the cluster having the variable K equal to one. There may be a constant lag value of one because there is only one cluster. The load values may be multiple values as represented by a variable A. Another of the clusters 606A may be generated when the value of the variable K is equal to two. Accordingly, the sub-models 608A may include sub-models $N_L N_{D1}$ and $N_L N_{D2}$. The load values may be multiple values as represented by a variable D. $N_L N_{D1}$ represents input to the sub-model with a lag value of one and $N_L N_{D2}$ represents input to the sub-model with a lag value of two. More generally, in FIG. 6 the variable M may represent a number of clusters (e.g., a value of the variable K) and a variable B may represent multiple load values. Accordingly, the sub-models 608A may include a sub-model $N_L N_{B1} \ldots N_L N_{BM}$ representing the load values (i.e., by the variable B) and each of the lag values (i.e., by the variable M) that may be included in the sub-models for a cluster of the clusters 606A having a value of the variable K equal to M.

Figure 7:
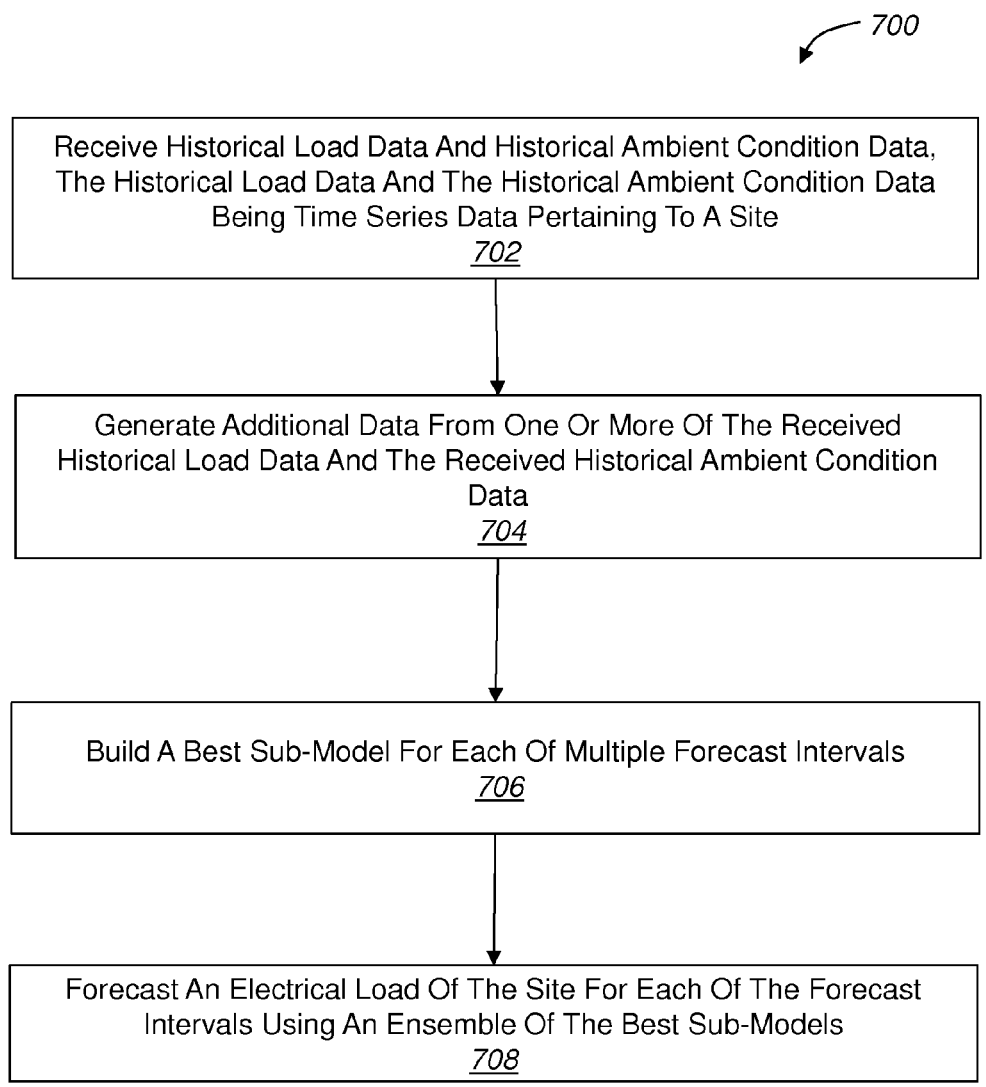
FIG. 7 is a flow diagram of an example method of forecasting an electrical load of a site, arranged in accordance with at least one embodiment described herein.

FIG. 7 is a flow diagram of an example method of forecasting an electrical load of a site, arranged in accordance with at least one embodiment described herein. The method 700 may be performed in a distribution system such as the distribution system 200 of FIG. 2 in which the utility 206 provides electricity to the sites 204. Similar methods may be implemented to forecast other behaviors and/or to forecast loads of any suitable resource.

The method 700 may be programmably performed in some embodiments by the system 154 described with reference to FIGS. 1A and 1B and/or by one or more of the utility 206, the DR aggregator 208, and the sites 204 of FIG. 2. In some embodiments, the system 154 may include or may be communicatively coupled to a non-transitory computer-readable medium (e.g., the memory 144 of FIG. 1A) having stored thereon programming code or instructions that are executable by a computing device (such as the system 154 and/or the processor 142) to cause the computing device to perform the method 700. Additionally or alternatively, the system 154 may include the processor 142 described above that is configured to execute computer instructions to cause a computing system to perform the method 700. Although illustrated as discrete blocks, various blocks may be divided into additional blocks, combined into fewer blocks, or eliminated, depending on the desired implementation.

At block 702, historical load data and historical ambient condition data may be received. The historical load data and the historical ambient condition data may be time series data pertaining to a site.

At block 704, additional data may be generated from one or more of the received historical load data and the received historical ambient condition data. The additional data may include load data combined with temperature data, differenced load data, and differenced load data combined with temperature data.

At block 706, a best sub-model may be built for each of multiple forecast intervals. In some embodiments, building the best sub-model may include: clustering in parallel a training portion of the historical load data and a training portion of the additional data, training possible forecasting sub-models using the clustered training portions of the historical load data and the additional data, verifying forecasted loads output from the possible forecasting sub-models against verification portions of the historical load data and the additional data, and determining a first subset of parameters for the best sub-model based upon accuracy of the forecasted loads. In some embodiments, the accuracy of the sub-model may be measured according to a MAPE.

Additionally, in these and other embodiments, verifying the forecasted loads may include one or more steps or operations. For example, verifying the forecasted loads may include extracting the verification portions of the historical load data and the additional data from each of the clusters. The forecasted load for a specific time interval may be compared against a corresponding verification portion for the specific time interval. The possible sub-model that produces the lowest error between the forecasted load and corresponding verification portion may be selected as the best sub-model. At block 708, an electrical load of the site at each of the forecast intervals may be forecast using an ensemble of the best sub-models built for each of the forecast intervals.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For instance, the method 700 may include tuning each of the best sub-models built for each of the forecast intervals.

In some embodiments, tuning each of the best sub-models may include clustering in parallel a tuning portion of the historical load data and a tuning portion of the additional data. The best forecasting sub-model may be trained using the clustered tuning portions of the historical load data and the additional data. The forecasted loads output from the best sub-model may be verified against second verification portions of the historical load data and the additional data. A second subset of parameters may be selected for the best sub-model based upon accuracy of the forecasted loads.

In some embodiments, the clustering may be performed according to a K-means clustering algorithm. In the K-means clustering algorithm, the value of a variable K may include each integer from one to a number of sub-intervals included in the forecasting interval.

Additionally or alternatively, the possible sub-models for each forecasting interval may include a neural network. In these and other embodiments, the first set of parameters may include a range of the variable K, a size of the training portion, a lag value, and a neural network structure. Additionally, the second set of the parameters may include a value of the variable K and a selection of one of the clusters on which to base the best sub-model.

In some embodiments, the method 700 may include subsequently tuning each of the best sub-models. Subsequently tuning the best sub-models may include updating the historical load data and the historical ambient condition data. Updated additional data may be generated from one or more of the updated load data and the updated ambient condition data. A subsequent tuning portion of the updated load data and a subsequent tuning portion of the updated additional data may be clustered in parallel. The best sub-model may be trained using the clustered updated tuning portions of the historical load data and the additional data. Updated forecasted loads output from the best sub-model may be verified against updated verification portions of the updated load data and the updated additional data. The second subset of parameters may then be updated for the best sub-model based upon accuracy of the updated forecasted loads.

In some embodiments, the building and the tuning may be performed according to a first schedule; and the subsequently tuning may be performed according to a second schedule. The first schedule may include multiple iterations of the second schedule.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of forecasting an electrical load of a site, the method comprising:
receiving historical load data and historical ambient condition data, the historical load data and the historical ambient condition data including time series data pertaining to a site;
generating additional data from one or more of the received historical load data and the received historical ambient condition data;
building a best sub-model for each of multiple forecast intervals, the building including:
clustering a training portion of the historical load data,
further clustering a training portion of the additional data in parallel with the clustering of the training portion of the historical load data,
training possible sub-models using the clustered training portions of the historical load data and the additional data,
verifying forecasted loads output from the possible sub-models against verification portions of the historical load data and the additional data, and
determining a first subset of parameters for the best sub-model based upon accuracy of the forecasted loads; and
forecasting an electrical load of the site for each of the forecast intervals using an ensemble of the best sub-models.

2. The method of claim 1, further comprising tuning each of the best sub models built for each of the forecast intervals, the tuning including:
clustering a tuning portion of the historical load data;
further clustering a tuning portion of the additional data in parallel with the clustering of the tuning portion of the historical load data;
training the best sub-model using the clustered tuning portions of the historical load data and the additional data;

verifying forecasted loads output from the best sub-model against second verification portions of the historical load data and the additional data; and selecting a second subset of parameters for the best sub-model based upon accuracy of the forecasted loads.

3. The method of claim 2, further comprising subsequently tuning each of the best sub-models, the subsequently tuning including:
updating the historical load data and the historical ambient condition data;
generating updated additional data from one or more of the updated load data and the updated ambient condition data;
clustering a subsequent tuning portion of the updated load data;
further clustering a subsequent tuning portion of the updated additional data in parallel with the clustering of the subsequent tuning portion of the updated load data;
training the best sub-model using the clustered updated tuning portions of the historical load data and the additional data;
verifying updated forecasted loads output from the best sub-model against updated verification portions of the updated load data and the updated additional data; and
updating the second subset of parameters for the best sub-model based upon accuracy of the updated forecasted loads.

4. The method of claim 3, the method further comprising:
performing the building and the tuning according to a first schedule; and
further performing the subsequently tuning according to a second schedule, the first schedule including multiple iterations of the second schedule.

5. The method of claim 2, wherein the clustering the tuning portion of the historical load data and the clustering the tuning portion of the additional data is performed according to a K-means clustering algorithm.

6. The method of claim 5, wherein the possible sub-models each include a neural network.

7. The method of claim 6, wherein:
the first subset of parameters includes a range of a variable K, a size of the training portion, a lag value, and a structure of the neural network;
the lag value indicates a number of time increments before the forecast intervals for which the electrical load is forecast from which the historical load data and additional data is drawn; and
the second subset of the parameters includes a value of the variable K and a selection of one of the clusters on which to base the best sub-model.

8. The method of claim 1, wherein the additional data includes load data combined with temperature data, differenced load data, and differenced load data combined with temperature data.

9. The method of claim 1, wherein the accuracy of the sub-model is measured according to a mean absolute percentage error (MAPE).

10. The method of claim 9, wherein the verifying includes:
extracting the verification portions of the historical load data and the additional data from each of the clusters;
comparing the forecasted load for a specific time interval against a corresponding verification portion for the specific time interval; and
selecting the possible sub-model that produces the lowest error between the forecasted load and the corresponding verification portion.

11. A non-transitory computer-readable medium having encoded therein programming code executable by a processor to perform operations comprising:
receiving historical load data and historical ambient condition data, the historical load data and the historical ambient condition data including time series data pertaining to a site;
generating additional data from one or more of the received historical load data and the received historical ambient condition data;
building a best sub-model for each of multiple forecast intervals, the building including:
clustering a training portion of the historical load data;
further clustering a training portion of the additional data in parallel with the clustering of the training portion of the historical load data,
training possible sub-models using the clustered training portions of the historical load data and the additional data,
verifying forecasted loads output from the possible sub-models against verification portions of the historical load data and the additional data, and
determining a first subset of parameters for the best sub-model based upon accuracy of the forecasted loads; and
forecasting an electrical load of the site for each of the forecast intervals using an ensemble of the best sub-models.

12. The non-transitory computer-readable medium of claim 11, wherein the operations further comprise tuning each of the best sub-models built for each of the forecast intervals, the tuning including:
clustering a tuning portion of the historical load data;
further clustering a tuning portion of the additional data in parallel with the clustering of the tuning portion of the historical load data;
training the best sub-model using the clustered tuning portions of the historical load data and the additional data;
verifying forecasted loads output from the best sub-model against second verification portions of the historical load data and the additional data; and
selecting a second subset of parameters for the best sub-model based upon accuracy of the forecasted loads.

13. The non-transitory computer-readable medium of claim 12, wherein the operations further comprise subsequently tuning each of the best sub-models, the subsequently tuning including:
updating the historical load data and the historical ambient condition data;
generating updated additional data from one or more of the updated load data and the updated ambient condition data;
clustering a subsequent tuning portion of the updated load data;
further clustering a subsequent tuning portion of the updated additional data in parallel with the clustering of the subsequent tuning portion of the updated load data;
training the best sub-model using the clustered updated tuning portions of the historical load data and the additional data;
verifying updated forecasted loads output from the best sub-model against updated verification portions of the updated load data and the updated additional data; and
updating the second subset of parameters for the best sub-model based upon accuracy of the updated forecasted loads.

14. The non-transitory computer-readable medium of claim 13, wherein the operations further comprise:
   performing the building and the tuning according to a first schedule; and
   further performing the subsequently tuning according to a second schedule, the first schedule including multiple iterations of the second schedule.

15. The non-transitory computer-readable medium of claim 12, wherein the clustering the tuning portion of the historical load data and the clustering the tuning portion of the additional data is performed according to a K-means clustering algorithm.

16. The non-transitory computer-readable medium of claim 15, wherein the possible sub-models each include a neural network.

17. The non-transitory computer-readable medium of claim 16, wherein:
   the first subset of parameters includes a range of a variable K, a size of the training portion, a lag value, and a structure of the neural network;
   the lag value indicates a number of time increments before the forecast intervals for which the electrical load is forecast from which the historical load data and additional data is drawn; and
   the second subset of the parameters includes a value of the variable K and a selection of one of the clusters on which to base the best sub-model.

18. The non-transitory computer-readable medium of claim 11, wherein the additional data includes load data combined with temperature data, differenced load data, and differenced load data combined with temperature data.

19. The non-transitory computer-readable medium of claim 11, wherein the accuracy of the sub-model is measured according to a mean absolute percentage error (MAPE).

20. The non-transitory computer-readable medium of claim 19, wherein the verifying includes:
   extracting the verification portions of the historical load data and the additional data from each of the clusters;
   comparing the forecasted load for a specific time interval against a corresponding verification portion for the specific time interval; and
   selecting the possible sub-model that produces the lowest error between the forecasted load and the corresponding verification portion.

* * * * *